United States Patent
Viroli et al.

(10) Patent No.: US 10,045,402 B2
(45) Date of Patent: Aug. 7, 2018

(54) METHOD OF DETECTING COOKWARE ON AN INDUCTION HOB, INDUCTION HOB AND COOKING APPLIANCE

(71) Applicant: Electrolux Appliances Aktiebolag, Stockholm (SE)

(72) Inventors: Alex Viroli, Forli (IT); Laurent Jeanneteau, Forli (IT); Svend Erik Christiansen, Forli (IT); Andrea Fattorini, Forli (IT); Paul Zhang, Springfield, TN (US)

(73) Assignee: Electrolux Appliances Aktiebolag, Stockholm (SE)

( * ) Notice: Subject to any disclaimer, the term of this patent is extended or adjusted under 35 U.S.C. 154(b) by 367 days.

(21) Appl. No.: 14/771,003

(22) PCT Filed: Feb. 7, 2014

(86) PCT No.: PCT/EP2014/052400
§ 371 (c)(1),
(2) Date: Aug. 27, 2015

(87) PCT Pub. No.: WO2014/139737
PCT Pub. Date: Sep. 18, 2014

(65) Prior Publication Data
US 2016/0037584 A1    Feb. 4, 2016

(30) Foreign Application Priority Data
Mar. 11, 2013 (EP) .................................... 13158489

(51) Int. Cl.
*H05B 6/12*    (2006.01)
*H05B 6/08*    (2006.01)
(Continued)

(52) U.S. Cl.
CPC ............. *H05B 6/062* (2013.01); *G01V 3/104* (2013.01); *H05B 6/1272* (2013.01); *H05B 2213/05* (2013.01); *Y02B 40/126* (2013.01)

(58) Field of Classification Search
CPC .......... H05B 6/06; H05B 6/062; H05B 6/065; H05B 6/12; H05B 6/1218; H05B 6/1272;
(Continued)

(56) References Cited

U.S. PATENT DOCUMENTS

| 5,424,514 A | 6/1995 | Lee |
| 2011/0192835 A1* | 8/2011 | Lee ........................ H05B 6/065 219/621 |

(Continued)

FOREIGN PATENT DOCUMENTS

| CN | 101953626 A | 1/2011 |
| CN | 102374558 A | 3/2012 |

(Continued)

OTHER PUBLICATIONS

International Search Report issued in Application No. PCT/EP2014/052400 dated Mar. 25, 2014.

*Primary Examiner* — Hung D Nguyen
(74) *Attorney, Agent, or Firm* — Pearne & Gordon LLP

(57) ABSTRACT

A method of detecting cookware (3) on an induction hob (1) including a plurality of induction heating coils (2) each being adapted for heating, in the activated state, cookware (3) placed on the induction hob (1). With the method, detecting cookware (3) is based on signals generated by at least one active induction heating coil (4) through the action of parasitic electromagnetic coupling effects in at least one inactive induction heating coil (6).

12 Claims, 2 Drawing Sheets

(51) Int. Cl.
  *H05B 6/06*    (2006.01)
  *G01V 3/10*    (2006.01)
(58) Field of Classification Search
  CPC ............ H05B 2213/03; H05B 2213/04; H05B
           2213/05; H05B 2213/07; G01V 3/104;
                        Y02B 40/126
  USPC ....... 219/620, 621, 622, 625, 626, 647, 656,
          219/662, 663, 664, 665, 666, 671, 672,
                                 219/675
  See application file for complete search history.

(56)            References Cited

U.S. PATENT DOCUMENTS

2012/0043312 A1*  2/2012  Lee .................... H05B 6/062
                                              219/622
2012/0285948 A1   11/2012 Shan

FOREIGN PATENT DOCUMENTS

| CN | 102428750 A   | 4/2012 |
| DE | 195 00 449 A1 | 7/1996 |
| DE | 197 00 753 A1 | 7/1998 |
| EP | 2 034 799 A1  | 3/2009 |
| EP | 2 416 621 A1  | 2/2012 |

\* cited by examiner

METHOD OF DETECTING COOKWARE ON AN INDUCTION HOB, INDUCTION HOB AND COOKING APPLIANCE

The present application in particular is related to a method of detecting cookware on an induction hob, and a respective induction hob.

In particular with induction hobs it is known to implement functions for automatically detecting presence of cookware on the cooktop face. For example, DE 197 00 753 A1 discloses a device for detecting the presence and/or size of cookware on a cooking zone, where a primary scanning coil and secondary detection coil are provided in order to determine presence and/or size of cookware placed on the cooktop face. Further methods and possibilities of detecting cookware on induction hobs are known from US 2012/0285948 A1, EP 2 416 621 A1, EP 2 034 799 A1 and DE 195 00 449 A1.

However, the known solutions for detecting cookware, in particular the solution as mentioned above, are comparatively complex and require comparatively involved detection cycles. Therefore, there is still need for further improving cookware detection, in particular with induction type cooking hobs.

It is therefore an object of the invention to overcome the problems observed with prior art. In particular, an improved method of detecting cookware on an induction hob shall be provided. Further, a corresponding induction hob and cooking appliance shall be provided.

According to one embodiment, a method of detecting cookware on an induction hob is provided. Cookware shall be understood to constitute cooking items, such as pots and pans and the like, that are suitable for being heated by induction heating coils of induction hobs.

The induction hob to which the proposed method can be applied to comprises a plurality, i.e. multiplicity, of induction heating coils. Each of the induction heating coils as required for the proposed method is adapted and configured for inductively heating, in the activated state, cookware placed on the induction hob face. In other words, an induction heating coil shall be understood, and be configured to be operable in order to inductively heat cookware placed on the cooking face. Hence each induction coil in the activated state contributes to the induction heating function of the induction hob. In order to avoid any ambiguity, scanning and detection coils as described in connection with the prior art and exclusively used for cookware detection purposes shall not constitute induction heating coils in the meaning of this application, in particular as they have no induction heating function.

With the proposed method, detecting cookware is based on signals generated by at least one active, i.e. activated, induction heating coil through the action of parasitic electromagnetic coupling effects in at least one inactive, i.e. deactivated, induction heating coil.

In general, the electromagnetic fields generated by activated induction heating coils in an induction hob influence or at least produce electromagnetic stray fields at surrounding induction heating coils. Therefore, the induction heating coils influence each other, which in general is undesirable. Such undesirable mutual influence or parasitic electromagnetic coupling cannot be completely removed.

The invention makes use of these parasitic electromagnetic coupling effects and advantageously uses them for detecting presence and/or movement and/or addition of cookware on induction hobs. This in particular has the advantage that no separate devices or detection units or scanning and detecting coils have to be provided. Just the induction heating coils already present are used.

A further advantage of the proposed method of detecting cookware is that it can be carried out continuously. With the proposed method it is generally not required to interrupt cooking or heating processes as is the case with methods known in the state of the art, in which cooking or heating processes have to be stopped during any new or repeated cookware detection cycle. Further advantages in particular result from the following description.

In embodiments it is provided that the signals, i.e. the signals as obtained from the at least one inactive induction heating coil by parasitic field coupling effects, are constantly monitored, in particular monitored for changes. This has the advantage over conventional methods for cookware detection that changes and/or movements or additions in cookware placed on the cooking face can immediately be identified, discovered or detected and the heating power of the induction hob can essentially immediately be adapted accordingly.

Adaption of the heating power in particular may comprise raising or lowering the overall heating power. However, adaptation of the heating power shall also comprise cases in which one or more induction heating coils are deactivated and a corresponding number, i.e. the same number, of induction heating coils is activated. Here in particular, the location of providing heating power may be changed, which may apply to situations in which cookware is moved or displaced on the cooking face.

Adapting the induction heating power according to observed or detected changes can be implemented, according to further embodiments, in that in the event of detecting a change in one of the signals, at least one of the induction heating coils is activated and/or at least one induction coil is deactivated.

It shall be mentioned that there may exist situations in which a change in one of the signals does not require adaptation in the induction heating power or induction heating constitution. Such situations may for example occur if an item of cookware on the induction hob face is moved only slightly such that no change in the activated and deactivated induction heating coils is required.

In embodiments, signals of induction heating coils surrounding or neighboring at least one active induction heating coil, preferably a contiguous group of active induction heating coils, are used for detecting at least one of cookware presence, cookware displacement and addition of additional cookware. As can be seen, the proposed method using signals caused by parasitic electromagnetic coupling can cope at least with the most relevant situations related to cookware detection and occurring during ordinary use of the induction hob.

In embodiments, the signal strength or signal amplitude of the signals of an inactive induction heating coil is used for determining the degree of coverage, i.e. the degree to which a respective induction coil is covered by cookware placed on the induction hob face. In particular, the degree of coverage may be determined continuously. The degree of coverage may be used as a criterion as to whether a deactivated induction heating coil shall be activated or an activated induction heating coil shall be deactivated. The degree of coverage in particular can be deduced from the amplitude of the signals generated by the parasitic electromagnetic coupling.

In embodiments, a parasitic induction current or parasitic induction voltage induced by parasitic electromagnetic coupling in at least one inactive induction heating coil is used as signal for cookware detection. For measuring the parasitic induction current or voltage, a shunt can be used. The shunt may for example be connected to an emitter side of a transistor, in particular insulated gate bipolar transistor (IGBT), wherein the induction heating coil, in more detail a connection line, is connected to the collector side of the transistor. In order to constantly measure the parasitic induction current or voltage in the inactive induction heating coil, the transistor, in particular the gate of the transistor, may be constantly powered. The current measured via the shunt may be amplified, if required, in order to be suitable for microcontroller reading and processing.

According to another embodiment, an induction hob is provided. The induction hob comprises a plurality of individual and selectively operable induction heating coils. The induction hob further comprises at least one cookware detection unit configured to execute a method as described above, in particular according to any embodiment of the proposed method. In particular, the cookware detection unit is specially adapted to detect cookware on the basis of signals generated by at least one active induction heating coil through the action of parasitic electromagnetic coupling effects in at least one inactive induction heating coil. The at least one cookware detection unit may comprise in each of the induction heating coils a subunit configured to detect, observe or monitor signals induced by parasitic electromagnetic coupling effects.

The proposed induction hob, in particular the cookware detection unit, provides a cookware detection functionality which can be implemented in a comparatively easy way, in particular with moderate technical effort. The advantages related to the method as described above and any advantages related thereto apply mutatis mutandis to the induction hob.

In embodiments the cookware detection unit comprises at least one microcontroller configured to constantly monitor signals generated by parasitic electromagnetic coupling effects in at least one inactive induction heating coil. In particular the microcontroller can monitor the signals for changes, and cause or signal respective generators to activate and/or deactivate the induction heating coil assigned thereto.

In further embodiments, each induction coil is coupled to a separate, in particular single, generator. In this way, induction heating power can be accurately controlled. This in particular may apply to configurations in which the induction heating coils of the induction hob are positioned in a matrix-like arrangement in lines and columns.

In embodiments, the at least one cookware detection unit comprises in each induction heating coil used for cookware detection an electronic component for measuring, at least in the inactive state of the induction heating coil, a parasitic induction current or voltage induced through parasitic electromagnetic coupling. For measuring the parasitic induction current, a shunt may be used. The shunt may be connected and implemented in connection with an IGBT as described above and further below.

The proposed possibility of using the parasitic induction current or voltage allows to constantly monitor the induction cooktop face. In using the proposed method, which can be termed "passive cookware detection", it is also possible to greatly reduce "click" noise as observed in cookware presence detection cycles upon activation of induction coils. Less click noise in particular results from the fact that parasitic feedback in inactive or inactivated induction heating coils is monitored requiring less active coils as compared to state of the art solutions.

According to yet another embodiment, a cooking appliance is proposed which comprises at least one induction hob according to any embodiment as described further above and below. As to advantages and advantageous effects, reference is made to the description above and below applying mutatis mutandis.

Selected embodiments will now be described in connection with the annexed figures, in which.

Figure 1:
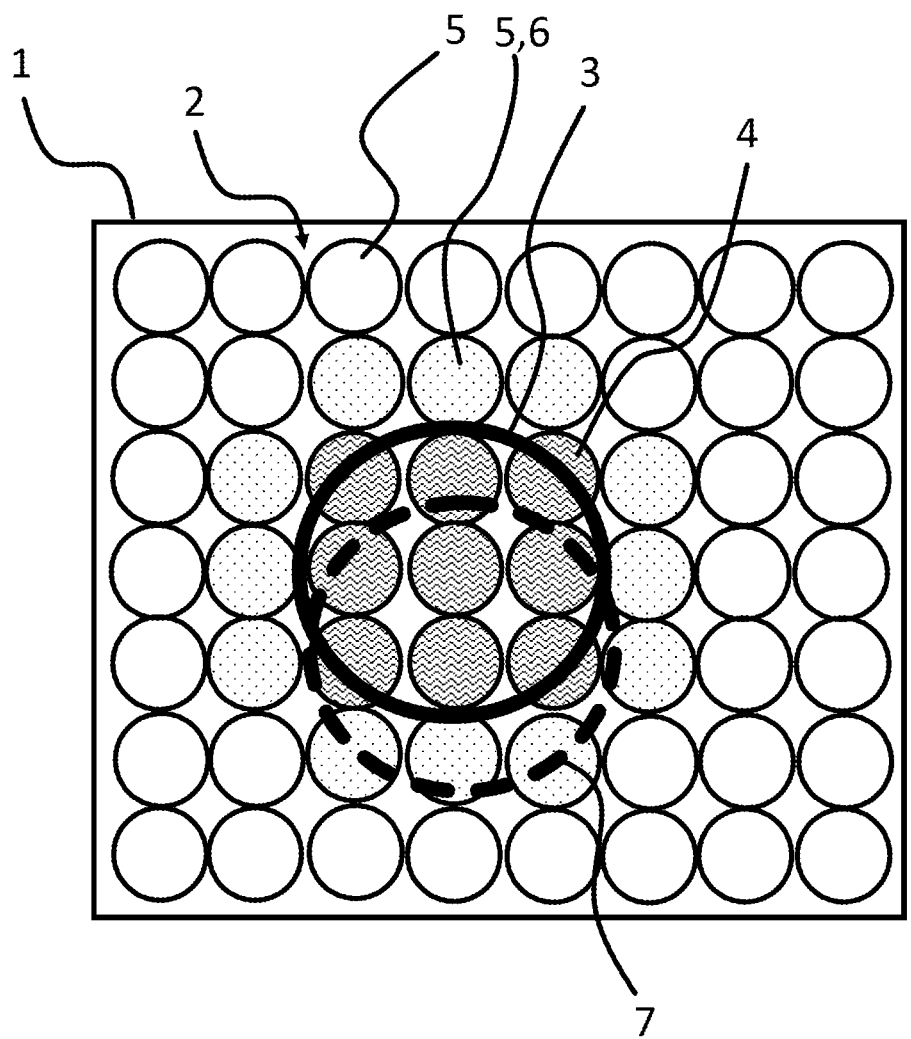
FIG. 1 shows a schematic top-view of an induction hob.

FIG. 1 shows a schematic top view of an induction hob 1. The induction hob 1 comprises in a matrix-type arrangement a plurality of induction heating coils 2. The induction heating coils 2 are arranged in rows and columns.

The induction heating coils are configured to generate an alternating electromagnetic field adapted to inductively heat cookware placed on the induction hob 1. In more detail, the induction heating coils 2 are configured to generate electromagnetic fields in turn generating induction currents or eddy currents in cookware placed on the induction hob 1. The principle of inductive heating in general is well known and shall not be described here in more detail.

An item of cookware 3, exemplarily a pot, is schematically indicated in FIG. 1 by an oval in solid lines. In the operational mode in which the item of cookware 3, i.e. pot, is inductively heated, each of a group of induction heating coils 2 covered by the pot 3 is powered, i.e. activated, to respectively generate alternating electromagnetic fields for inductively heating up the pot 3. The group of powered induction heating coils can be considered as a group of active induction heating coils which in the following are designated for the sake of simplicity as primary induction heating coils 4.

In the representation of FIG. 1, in total nine primary induction heating coils 4 underneath the pot 3 are present. All other induction heating coils 2 are not powered and therefore are in the inactive state, i.e. represent inactive induction heating coils 5.

In the present configuration, each induction heating coil 2 is coupled or associated with a separate, single generator. The electromagnetic field generated by the primary induction heating coils 4 is mostly coupled into the pot 3 for inductively heating the same. However, a part of the electromagnetic field generated by a primary induction heating coil 4 couples or extends to the neighborhood, in particular to neighboring or adjacent inactive induction heating coils 5. This kind of electromagnetic coupling represents parasitic electromagnetic coupling in the sense of the present invention.

Inactive induction heating coils 5 immediately adjacent to primary induction heating coils 4 are indicated by a dashed texture and designated as secondary induction heating coils 6. With the secondary induction heating coils 6, signals generated through the parasitic electromagnetic coupling effects are monitored. In more detail, parasitic electromagnetic coupling effects generate parasitic induction currents or voltages, i.e. signals, in at least the secondary induction heating coils 6. Based on these parasitic signals, which also can be called passive feedback signals, it can be determined whether the pot 3 is still in place or it has been moved on the induction hob 1.

A movement of the pot 3 on the induction hob 1 is schematically indicated in FIG. 1 by a dashed oval, representing the displaced pot 7. As can readily be seen from FIG. 1, movement or displacement of the pot 3 will alter the coupling conditions, in particular parasitic electromagnetic field coupling in the secondary induction heating coils 6.

Changes in the parasitic electromagnetic field coupling will result in changes in the parasitic induction currents or voltages, i.e. parasitic signals, generated in the secondary induction heating coils 6. In particular, if the signals are constantly monitored for changes, the changes in the signals can be observed and are indicative of the displacement of the pot 3 on the induction hob 1. Based on the observed displacement, a new group of induction heating coils 2 covered by the pot in the displaced location can be activated whilst some of the formerly activated induction heating coils can be deactivated.

As can be seen, passive cookware detection, i.e. cookware detection by using parasitic induction signals generated by parasitic electromagnetic coupling in inactive induction heating coils is effective in cookware detection, in particular in cookware displacement detection.

However, not only displacement detection is possible with the proposed method of passive cookware detection. Activating one or a limited number of the induction heating coils 2 and measuring or evaluating the passive feedback, i.e. signals induced by parasitic electromagnetic coupling in inactive induction heating coils 5, can be used for detecting the presence of cookware in the induction heating face, in particular in cases when no cookware is present on the induction hob 1 and no induction heating coil 2 is in the active state, i.e. generates an inductive electromagnetic field for heating the cookware.

If already one or more items of cookware 3 are present on the induction hob 1, and a group of induction heating coils 2 is activated for heating the cookware 3, the addition of a new item of cookware, such as a pot or pan, can be observed by measuring or evaluating the passive feedback or changes in the passive feedback in the inactive induction coils, in particular in inactive induction coils neighboring the activated induction heating coils.

Another operational mode in cookware detection by measuring, analyzing or evaluating passive feedback or changes thereof is to determine the degree of coverage of induction heating coils, i.e. the degree by which the induction heating coil is covered by an item of cookware. Here, the amplitude of the passive feedback signal, in particular parasitic induction current, can be used to determine or find out the degree of coverage. The degree of coverage may be used as a decision criterion for activating or deactivating an induction heating coil.

Figure 2:
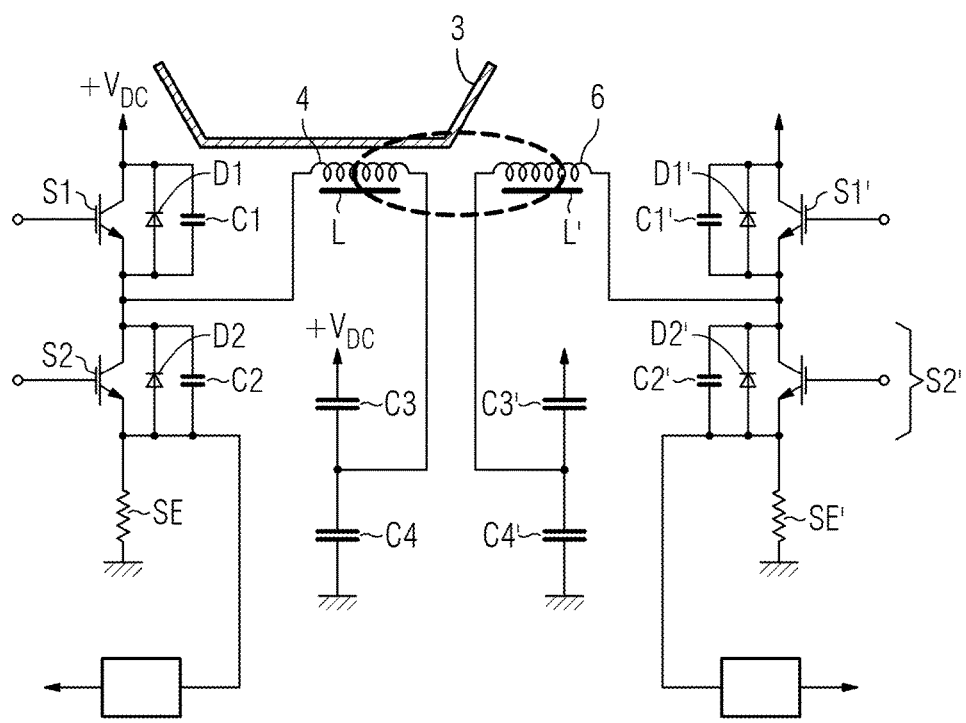
FIG. 2 shows exemplary electronic circuitries of a pair of induction heating coils of the induction hob in FIG. 1.

FIG. 2 shows exemplary electronic circuitries of a pair of induction heating coils 2 of the induction hob 1 as shown and described in connection with FIG. 1. The left-hand induction heating coil is one of the primary induction heating coils 4, and the right-hand induction heating coil is one of the secondary induction heating coils 6 adjacent or nearby the primary induction heating coil 4. Parasitic electromagnetic coupling is indicated by a dashed oval in FIG. 2.

The primary induction heating coil 4 generates an alternating electromagnetic field for inductively heating the item of cookware 3. This electromagnetic field causes parasitic electromagnetic coupling effects in the secondary induction heating coil 6. The parasitic electromagnetic coupling in more detail may results in parasitic induction currents flowing through resonant capacitors C3' and C4', connected to one end of the secondary induction heating coil 6, to the IGBT S2' and the and parallel Diode D2', respectively connected to the other end of the secondary induction heating coil 6.

Provided that the gate of IGBT S2' is constantly powered, the parasitic induction current flows through shunt SE' and its amplitude can be determined. The amplitude of the parasitic induction current can be amplified to a certain value, in particular such that it can be processed or handled by a microcomputer.

If the parasitic induction current is constantly monitored for changes, a respective microcontroller, for example, can derive from changes occurring in the parasitic induction current the above identified situations, such as cookware displacement or cookware addition and so on.

Upon activating an induction heating coil, the part of the circuitry for monitoring the parasitic induction current can be disabled, which may be obtained by adequately controlling the gate of IGBT S2'.

In all it can be seen that passive cookware detection based on parasitic electromagnetic field coupling effects as proposed and described herein is an effective and, as compared to state of the art techniques, comparatively comfortable solution for cookware detection on induction hobs.

LIST OF REFERENCE NUMERALS

1 induction hob
2 induction heating coil
3 cookware
4 primary induction heating coil
5 inactive induction heating coil
6 secondary induction heating coil
7 displaced cookware

What is claimed is:

1. A method of detecting cookware on an induction hob comprising a plurality of induction heating coils each being adapted for heating, in the activated state, cookware placed on the induction hob, characterized in that detecting cookware is based on signals generated by at least one active induction heating coil through the action of parasitic electromagnetic coupling effects in at least one inactive induction heating coil.

2. The method according to claim 1, wherein the signals generated in the at least one inactive induction coil by parasitic electromagnetic coupling are constantly monitored, in particular monitored for changes.

3. The method according to claim 2, wherein in the event of detecting a change in one of the signals at least one induction coil is activated and/or at least one induction coil is deactivated.

4. The method according to claim 1, wherein signals of induction heating coils neighboring at least one active induction heating coil, preferably a contiguous group of active induction heating coils, are used for detecting at least one of cookware presence, cookware displacement and addition of additional cookware.

5. The method according to claim 1, wherein the signal strength or signal amplitude of the signals of an inactive induction heating coil is used for determining the degree to which a respective induction coil is covered by cookware.

6. The method according to claim 1, wherein a parasitic induction current or parasitic induction voltage induced by parasitic electromagnetic coupling in at least one inactive induction heating coil is used as signal for cookware detection.

7. The method according to claim 6, wherein a shunt is used for measuring the parasitic induction current, wherein the shunt is preferably connected to an emitter side of a transistor, in particular an insulated gate bipolar transistor, and wherein a respective induction heating coil is connected to a collector side of the transistor.

8. An induction hob comprising a plurality of individual and selectively operable induction heating coils characterized in that it further comprises at least one cookware detection unit which is adapted to detect cookware based on signals generated by at least one active induction heating coil through the action of parasitic electromagnetic coupling effects in at least one inactive induction heating coil.

9. The induction hob according to claim 8, wherein the cookware detection unit comprises at least one microcontroller configured to constantly monitor signals generated by parasitic electromagnetic coupling effects in at least one inactive induction heating coil.

10. The induction hob according to claim 8, wherein each induction heating coil is coupled to a separate, in particular single, generator.

11. The induction hob according to claim 8, wherein the at least one cookware detection unit comprises in each induction heating coil used for cookware detection an electronic component for measuring, at least in the inactive state of the induction heating coil, a parasitic induction current or voltage induced through parasitic electromagnetic coupling.

12. A cooking appliance comprising at least one induction hob comprising a plurality of individual and selectively operable induction heating coils characterized in that it further comprises at least one cookware detection unit which is adapted to detect cookware based on signals generated by at least one active induction heating coil through the action of parasitic electromagnetic coupling effects in at least one inactive induction heating coil.

* * * * *